(12) United States Patent
Young et al.

(10) Patent No.: US 11,148,147 B2
(45) Date of Patent: *Oct. 19, 2021

(54) DISCRETIZER AND METHOD OF USING SAME

(71) Applicant: The Procter & Gamble Company, Cincinnati, OH (US)

(72) Inventors: Christopher Michael Young, Loveland, OH (US); Steven Lee Barnholtz, West Chester, OH (US); Fei Wang, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/708,596

(22) Filed: Dec. 10, 2019

(65) Prior Publication Data

US 2020/0114366 A1 Apr. 16, 2020

Related U.S. Application Data

(63) Continuation of application No. 15/172,271, filed on Jun. 3, 2016, now Pat. No. 10,543,488.

(60) Provisional application No. 62/174,676, filed on Jun. 12, 2015.

(51) Int. Cl.
| | | |
|---|---|---|
| *B02C 13/02* | (2006.01) | |
| *B02C 13/286* | (2006.01) | |
| *B02C 13/284* | (2006.01) | |
| *B32B 7/04* | (2019.01) | |
| *B32B 5/02* | (2006.01) | |
| *B32B 5/26* | (2006.01) | |

(52) U.S. Cl.
CPC ............ *B02C 13/02* (2013.01); *B02C 13/284* (2013.01); *B02C 13/286* (2013.01); *B32B 5/02* (2013.01); *B32B 5/26* (2013.01); *B32B 7/04* (2013.01); *B02C 2013/28609* (2013.01); *B32B 2255/02* (2013.01); *B32B 2603/00* (2013.01)

(58) Field of Classification Search
CPC ......... B02C 13/02; B02C 13/284; B32B 5/02; B32B 5/26; B32B 7/04
See application file for complete search history.

(56) References Cited

U.S. PATENT DOCUMENTS 2,861,299 A * 11/1958 Day .......................... B07B 4/04
209/137
3,030,245 A 4/1962 Greiner et al.
(Continued)

FOREIGN PATENT DOCUMENTS

| DE | 11 22 823 B | 1/1962 |
| GB | 1 224 325 A | 3/1971 |
| GB | 2493292 | 1/2013 |

OTHER PUBLICATIONS

All Office Actions Application U.S. Appl. Nos. 15/172,271; 15/172,172; 15/172,174; 15/243,140; 13/889,415.
(Continued)

*Primary Examiner* — Shaun R Hurley
(74) *Attorney, Agent, or Firm* — C. Brant Cook

(57) ABSTRACT

Discretizers that exhibit improved solid additive laden fluid flow emanating from the discretizers and methods of using same, particularly for making fibrous structures are provided.

9 Claims, 10 Drawing Sheets

(56) References Cited

U.S. PATENT DOCUMENTS

| | | | | |
|---|---|---|---|---|
| 3,268,954 | A | * | 8/1966 | Joa .................. D21H 11/14 264/518 |
| 3,509,604 | A | | 5/1970 | Furbeck |
| 3,637,146 | A | * | 1/1972 | Banks ................ B02C 13/28 241/194 |
| 3,886,629 | A | * | 6/1975 | Nakai ................ D04H 1/72 425/83.1 |
| 4,060,360 | A | | 11/1977 | Tapp |
| 4,205,794 | A | * | 6/1980 | Horton ............... B02C 13/02 241/73 |
| 4,241,881 | A | * | 12/1980 | Laumer .............. D21B 1/068 241/28 |
| 4,315,347 | A | * | 2/1982 | Austin ............... D04H 1/72 19/105 |
| 4,366,111 | A | | 12/1982 | Dinius et al. |
| 4,402,464 | A | * | 9/1983 | Shire, Sr. ............ B02C 13/02 241/154 |
| 4,441,994 | A | * | 4/1984 | Beneke ............. D01G 31/003 209/139.1 |
| 4,701,294 | A | * | 10/1987 | Radwanski ....... A61F 13/15658 264/116 |
| 4,741,941 | A | | 5/1988 | Englebert et al. |
| 4,970,104 | A | | 11/1990 | Radwanski |
| 5,306,453 | A | | 4/1994 | Shulman |
| 5,526,988 | A | * | 6/1996 | Rine ................. B02C 13/02 241/189.1 |
| 5,580,423 | A | | 12/1996 | Ampulski et al. |
| 5,725,927 | A | | 3/1998 | Freundenberg |
| 5,962,112 | A | | 10/1999 | Haynes et al. |
| 5,988,537 | A | * | 11/1999 | Marra ................ B02C 13/04 241/28 |
| 6,233,787 | B1 | | 5/2001 | Eriksen et al. |
| 7,597,200 | B2 | * | 10/2009 | Christensen ........... B27N 3/14 209/139.1 |
| 7,972,986 | B2 | | 7/2011 | Barnholtz et al. |
| 8,758,569 | B2 | | 6/2014 | Aberg et al. |
| 9,103,057 | B2 | | 8/2015 | Polosa et al. |
| 9,458,573 | B2 | | 10/2016 | Barnholtz et al. |
| 10,543,488 | B2 | * | 1/2020 | Young ................. B02C 13/02 |
| 2002/0116792 | A1 | * | 8/2002 | Pinto ................. D01G 13/00 19/105 |
| 2003/0002991 | A1 | | 1/2003 | Kawata et al. |
| 2003/0200991 | A1 | | 10/2003 | Keck et al. |
| 2003/0211802 | A1 | | 11/2003 | Keck et al. |
| 2011/0244199 | A1 | | 10/2011 | Brennan et al. |
| 2011/0250378 | A1 | | 10/2011 | Eaton et al. |
| 2011/0303373 | A1 | * | 12/2011 | Young ................. D04H 1/736 162/100 |
| 2012/0006338 | A1 | | 1/2012 | Herrmann et al. |
| 2013/0101615 | A1 | | 4/2013 | Greenstein |
| 2013/0337713 | A1 | | 12/2013 | Young et al. |
| 2016/0256872 | A1 | * | 9/2016 | Fukuhiro ............ B02C 13/04 |

OTHER PUBLICATIONS

PCT International Search Report dated Aug. 8, 2016—5 pages.
PCT International Search Report dated Aug. 3, 2016—5 pages.
PCT International Search Report dated Oct. 4, 2016—7 pages.
PCT International Search Report dated Dec. 5, 2016—5 pages.
U.S. Appl. No. 15/172,172, filed Jun. 3, 2015, Christopher Michael Young, et al.
U.S. Appl. No. 15/172,174, filed Jun. 3, 2015, Christopher Michael Young, et al.
U.S. Appl. No. 15/243,140, filed Aug. 22, 2016, Steven Lee Barnholtz, et al.
U.S. Appl. No. 13/889,415, filed May 8, 2013, Steven Lee Barnholtz, et al.

* cited by examiner

DISCRETIZER AND METHOD OF USING SAME

FIELD OF THE INVENTION

The present invention relates to discretizers, and more particularly to discretizers that exhibit improved solid additive laden fluid flow emanating from the discretizers and methods of using same, particularly for making fibrous structures.

BACKGROUND OF THE INVENTION

Discretizers are widely used in creating air laid fibrous structures. One common type of discretizer used in air conveyed processes is the hammer mill. These devices are typically comprised of some type of system to deliver solid additives, such as fibers, for example pulp fibers, via air. An example of one system used by a discretizer to deliver solid additives is an infeed roller system through which webs of pulp pass into a housing that contains a large rotor. This rotor can contain a plurality of swinging hammers that contact the web of pulp to discretize individual pulp fibers from the web. The device may further contain a screen through which the individualized pulp fibers move for further use. The rotation of the rotor, however, imparts a strong asymmetry to the fluid, for example air, coming out of the device, for example hammer mill, that causes a non-homogeneous mixture of the pulp and air to exit the hammer mill.

Prior Art FIG. 1A illustrates an example of a discretizer that is commercially available from DanWeb. As shown in FIG. 1A, a discretizer 10 comprises a housing 12 that contains a rotor 14 having a plurality of swinging hammers 16 and a screen 18 through which individualized solid additives, for example pulp fibers, may travel through. As the rotor 14 rotates in the direction of the arrow (counter-clockwise), a web of pulp 19 is introduced into the discretizer 10 such that the swinging hammers 16 individualize pulp fibers from the web of pulp 19. The rotation of the rotor 14 imparts a strong asymmetry to the air coming out of the discretizer's intermediate discharge outlet 20A as shown in the general air flow arrows and shown in the air flow map 22. As shown by the air flow map 22, a large, but not complete portion of the air flowing out of the discretizer's intermediate discharge outlet 20A is flowing in the general direction of A. However, there is a component of the air flow that creates one or more zones of separated flow B. These one or more zones of separated flow B result in the air flow map 22 having a component that has a directional flow into the discretizer 10 not out of the discretizer's intermediate discharge outlet 20A.

In this particular example, the housing 12 of the discretizer 10 of Prior Art FIG. 1A comprises parallel walls 13, but the ultimate discharge outlet 20B is horizontal and the discharge area is less than the projected area of the screen 18 upon the discharge plane DP1. While the flow recirculation is smaller in this design, the change in direction means that the solid additives, for example pulp fibers, contained within the discretizer 10 experience significant direction changes. Given the high difference in density between pulp and air, this results in a non-homogenous mixture of air and pulp upon exiting the discretizer's ultimate discharge outlet 20B.

As shown in Prior Art FIG. 1A, the discretizer 10 exhibits a discharge area in a discharge plane DP1 oriented at a discharge angle θ of 20° or less.

Prior Art FIG. 1B illustrates another example of a discretizer, which is commercially available from Oerlikon Neumag. As shown in FIG. 1B, the discretizer 10 comprises a housing 12 that contains a rotor 14 having a plurality of swinging hammers 16. As the rotor 14 rotates in the direction of the arrow (counter-clockwise), a web of pulp 19 is introduced into the discretizer 10 such that the swinging hammers 16 individualize pulp fibers from the web of pulp 19. The individualized pulp fibers may then travel through the screen 18. The rotation of the rotor 14 imparts a strong asymmetry to the air coming out of the discretizer's discharge outlet 20 as shown in the general air flow arrows and shown in the air flow map 22. As shown by the air flow map 22, a large, but not complete portion of the air flowing out of the discretizer's discharge outlet 20 is flowing in the general direction of A. However, there is a component of the air flow that creates one or more zones of separated flow B. These one or more zones of separated flow B results in the air flow map 22 having a component that has a directional flow into the discretizer 10 not out of the discretizer's discharge outlet 20. This discretizer 10 comprises parallel walls 13 that are ostensibly tangent to the rotation of the rotor 14 and a discharge outlet 20, which is a vertical discharge outlet, from the discretizer 10 whose discharge area is greater than the projected area of the screen 18 upon the discharge plane DP1. At air flows common to use in this discretizer 10 the counter-clockwise rotation of the rotor 14 sets up an air stream, with respect to the discretizer 10 as specifically shown in FIG. 1B, that is much faster on the right side as represented by arrow A, with flow returning upwards on the left side creating one or more zones of separated flow B. This discretizer 10 exhibits a discharge area in a discharge plane DP1 oriented at a discharge angle θ of about 90°.

As the air departs the area immediately around the discretizer's rotor 14 it has a velocity vector that is strongly influenced by the counter-clockwise rotation of the rotor 14. Even if the discretizer 10 contains a screen 18, the orifices in the screen 18 do not have a large enough L/D to serve as a redirecting mechanism to more radially align the air passing through them. Subsequent to the screen 18 there are walls 13 that are parallel to approximately the tangent points of the discretizer's rotor 14. Since, by definition, the rotor 14 must rotate away from at least one of these walls 13, a flow separation occurs creating a zone of separated flow B. This flow separation, if allowed unfettered propagation, will increase to fully recirculating regions below the rotor 14 (for example between the rotor 14 and the discharge outlet 20). With solid additives, such as pulp fibers, in the air, these flow recirculations can then build up solid additives in them until gravity or other forces pull them into the stream of flow. This results in uneven solid additive flows in the system.

As shown in Prior Art FIG. 1C another example of a discretizer 10 that is similar to the discretizer 10 shown in Prior Art FIG. 1B is commercially available from Oerlikon Neumag, for example under the trade name Oerlikon Neumag 950. Like the discretizer 10 shown in FIG. 1B, this discretizer 10 comprises a housing 12 that contains a rotor 14 having a plurality of swinging hammers 16. As the rotor 14 rotates in the direction of the arrow, a web of pulp 19 is introduced into the discretizer 10 such that the swinging hammers 16 individualize pulp fibers from the web of pulp 19. The individualized pulp fibers may then travel through the screen 18. The rotation of the rotor 14 imparts a strong asymmetry to the air coming out of the discretizer's discharge outlet 20 as shown in the general air flow arrows and shown in the air flow map 22. As shown by the air flow map 22, a large, but not complete portion of the air flowing out of the discretizer's discharge outlet 20 is flowing in the general direction of A. However, there is a component of the air flow that creates one or more zones of separated flow B. These one or more zones of separated flow B results in the air flow map 22 having a component that has a directional flow into the discretizer 10 not out of the discretizer's discharge outlet 20. This discretizer 10 exhibits parallel walls 13 that are ostensibly tangent to the rotation of the rotor 14 and a discharge outlet 20, a vertical discharge outlet, from the discretizer 10 whose discharge area is greater than the projected area of the screen 18 upon the discharge plane DP1. At air flows common to use in this discretizer 10 the counter-clockwise rotation of the rotor 14 will set up an air stream, with respect to the discretizer 10 as specifically shown in FIG. 1C, that is much faster on the right side as represented by arrow A, with flow returning upwards on the left side creating one or more zones of separated flow B. This discretizer 10 exhibits a discharge area in a discharge plane DP1 oriented at a discharge angle θ of about 90°.

As the air departs the area immediately around the discretizer's rotor 14 it has a velocity vector that is strongly influenced by the rotation of the rotor 14. Even if the discretizer 10 contains a screen 18, the orifices in the screen 18 do not have a large enough L/D to serve as a redirecting mechanism to more radially align the air passing through them. Subsequent to the screen 18 there are walls 13 that are parallel to approximately the tangent points of the discretizer's rotor 14. Since, by definition, the rotor 14 must rotate away from at least one of these walls 13, a flow separation occurs creating a zone of separated flow B. This flow separation, if allowed unfettered propagation, will increase to fully recirculating regions below the rotor 14. With solid additives in the air, these flow recirculations can then build up solid additives in them until gravity or other forces pull them into the stream of flow. This results in uneven solid additive flows in the system.

One problem with existing discretizers is that they impart asymmetry to their solid additive laden air flows and/or create zones of separated flow during operation. Such asymmetrical air flows can create issues in managing the solid additives and the flows in further processes, such as fibrous structure making processes that utilize such discretizers to supply solid additives, such as pulp fibers, to the processes.

Accordingly, there is a need for a discretizer that eliminates and/or mitigates the negatives with existing discretizers; namely, eliminates and/or mitigates the asymmetry of flows exiting the discretizer and/or eliminates and/or mitigates zones of separated flow within the discretizer and a need for a method for making a fibrous structure that utilizes a discretizer that eliminates and/or mitigates the negatives associated with existing discretizers.

SUMMARY OF THE INVENTION

The present invention fulfills the needs described above by providing a discretizer that eliminates and/or mitigates the asymmetry flows exiting the discretizer and/or eliminates and/or mitigates zones of separated flow within the discretizer and methods for making fibrous structures that utilize the improved discretizers of the present invention.

One solution to the problem identified above is to provide a discretizer that is configured to eliminate and/or mitigate the asymmetry of flows by providing inserts and/or cross flow members within the discretizer to result in a more symmetrical flow and/or a flow free of zones of separated flow and/or a discretizer that is configured such that its discharge area in its discharge plane is equal to or less than, for example less than, its rotor's projected area upon its discharge plane and/or a discretizer having walls, for example at least two opposing walls extending from the discretizer's discharge outlet toward the rotor, that are non-parallel to each other.

In one example of the present invention, a discretizer, for example a solid additive discretizer, comprising a housing and a rotor movable within the housing, which discretizes during operation a plurality of solid additives from a source of solid additives, the housing comprising a discharge outlet having a discharge area in a discharge plane oriented at a discharge angle of greater than 20°, wherein the discharge area of the discharge outlet is equal to or less than, for example less than, the rotor's projected area upon the discharge plane, is provided.

In another example of the present invention, a discretizer, for example a solid additive discretizer, comprising a housing and a rotor movable within the housing, which discretizes during operation a plurality of solid additives from a source of solid additives, the housing comprising a discharge outlet having a discharge area of a discharge plane, wherein the housing further comprises CD walls below and closest to the rotor that are non-parallel with each other, is provided.

In yet another example of the present invention, a discretizer, for example a solid additive discretizer, comprising a housing and a rotor movable within the housing, which discretizes during operation a plurality of solid additives from a source of solid additives, wherein the discretizer further comprises one or more cross flow members less than two rotor diameters below the center of the rotor, is provided.

In even another example of the present invention, a discretizer, for example a solid additive discretizer, comprising a housing and a rotor movable within the housing, which discretizes during operation a plurality of solid additives from a source of solid additives, wherein the discretizer creates a unidirectional flow at its discharge outlet, is provided.

In even yet another example of the present invention, a discretizer, for example a solid additive discretizer, comprising a housing and a rotor movable within the housing, which discretizes during operation a plurality of solid additives from a source of solid additives, wherein the discretizer creates a flow that is free of zones of separated flow, is provided.

In still yet another example of the present invention, a method for making a fibrous structure, the method comprising the step of supplying a plurality of solid additives, for example pulp fibers, from a discretizer, for example a solid additive discretizer, of the present invention to a fibrous structure making process, is provided.

Accordingly, the present invention provides a discretizer, for example a solid additive discretizer, that overcomes one or more of the negatives associated with existing discretizers.

BRIEF DESCRIPTION OF THE DRAWINGS

FIG. 1A is a Prior Art example of a discretizer;

FIG. 1B is a Prior Art example of another discretizer;

FIG. 1C is a Prior Art example of another discretizer;

FIG. 2 is an example of a discretizer in accordance with the present invention;

FIG. 3 is another example of a discretizer in accordance with the present invention;

FIG. 4 is another example of a discretizer in accordance with the present invention;

DETAILED DESCRIPTION OF THE INVENTION

Definitions

"Aspect Ratio" as used herein is measured by first striking a plane either perpendicular to the direction of flow in case the flow is primarily unidirectional or parallel with the discharge from the volume in the case of non-unidirectional flow. This plane will then define a surface bounded by the walls of the device. With that surface placed on an x-y grid, the lengths of the surface can be determined in these coordinates. The aspect ratio is then defined as the larger length divided by the smaller length.

"MD and CD" as used herein refer to the direction of rotation of the discretizer. The MD is a plane perpendicular to the rotor axis of rotation. The CD is defined as a plane perpendicular to the MD plane.

"Cross Flow Member" as used herein means an object at least partially contained within an enclosed volume around which flow separates and reconvenes in less than twenty hydraulic diameters of the object, said hydraulic diameter calculated on a plane which is perpendicular to the direction of flow and located at the maximum cross sectional area of the object; said area of the member being less than the cumulative area of the void volume in the same plane. In the example of a screen, the solid portions between each individual hole would be a cross flow member. In the example of a pinned roller, each pin as well as the body of the roller would be an example of a cross flow member.

"Hydraulic Diameter" as used herein means four times the area of an object divided by the total perimeter of that same object.

"Projected Area" as used herein means the two-dimensional area measurement of a three-dimensional object by projecting its shape on to an arbitrary plane, the rectilinear parallel projection of a surface of any shape onto a plane.

"Discharge Area" as used herein means the area bounded by walls and normal to the direction of flow out of a discretizer "Discharge Plane" as used herein means the infinite plane in which the discharge area is located.

"Discharge Angle" as used herein means the angle between discharge plane and tangent plane of the CD wall closest to below the center of rotation. If the CD walls closest to below the center of rotation exhibit different discharge angle values, then the average of the discharge angle value is used.

Discretizer

The discretizers of the present invention overcome the negatives associated with existing discretizers as discussed above. In one example, the discretizer of the present invention is a solid additive discretizer, for example a pulp fiber discretizer.

The discretizers of the present invention are supplied with a source of solid additives, such as a web of pulp, for example rolled pulp and/or baled pulp.

During operation of the discretizers, individualized solid additives, for example pulp, are discretized from a source of solid additives.

Figure 1A:
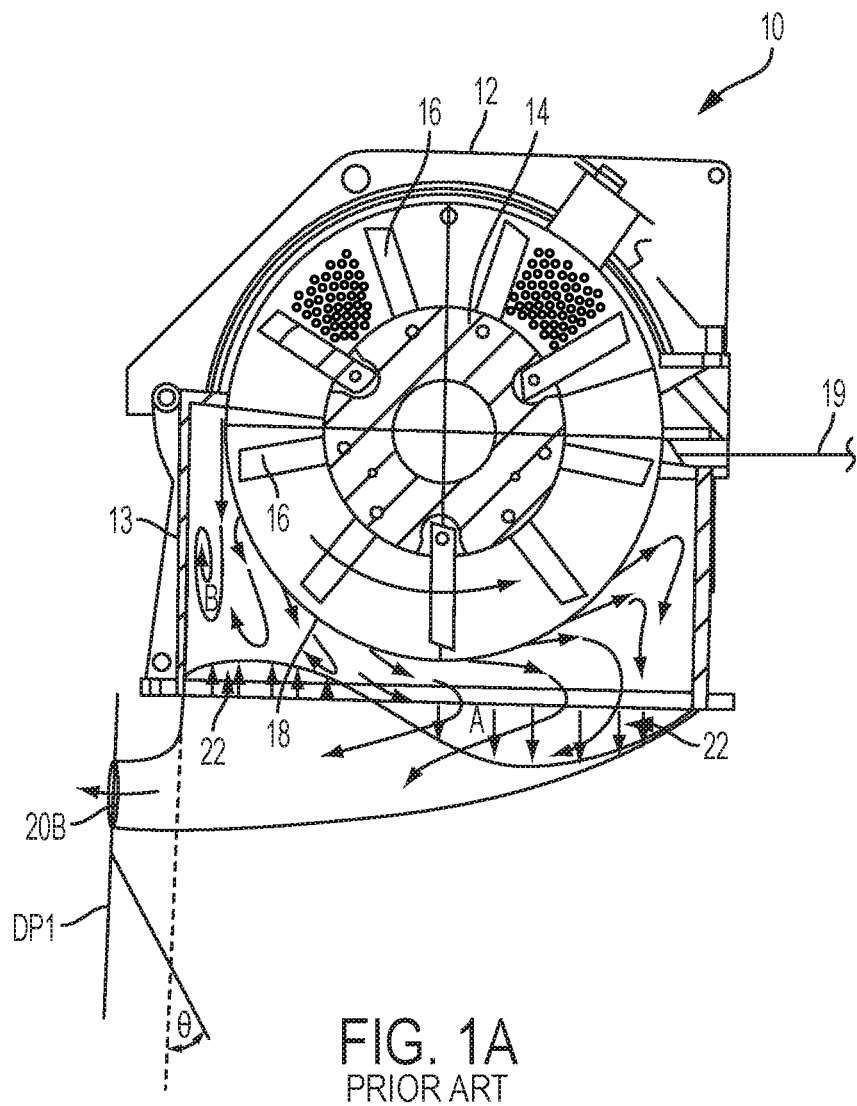
Figure 1B:
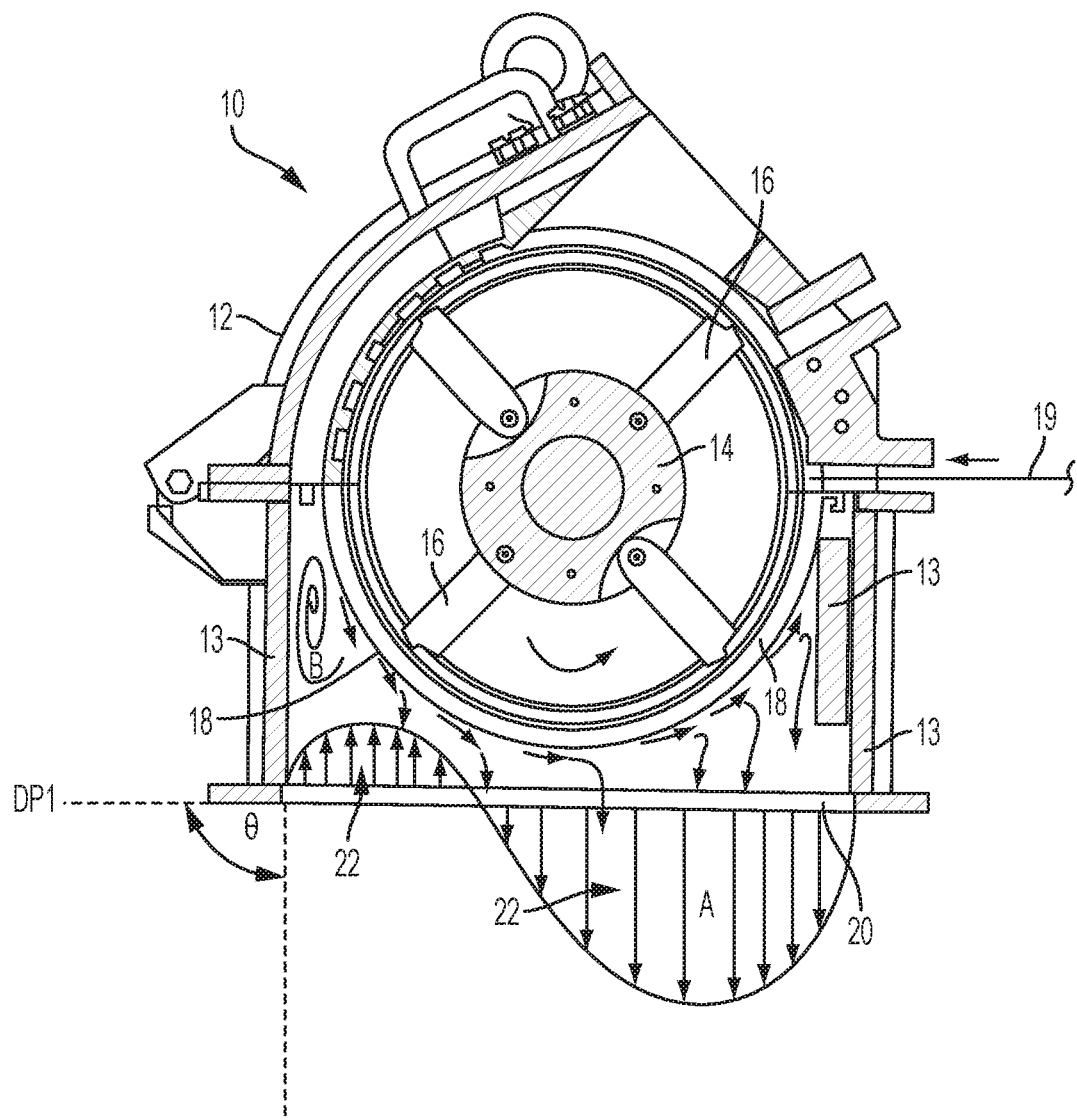
Figure 1C:
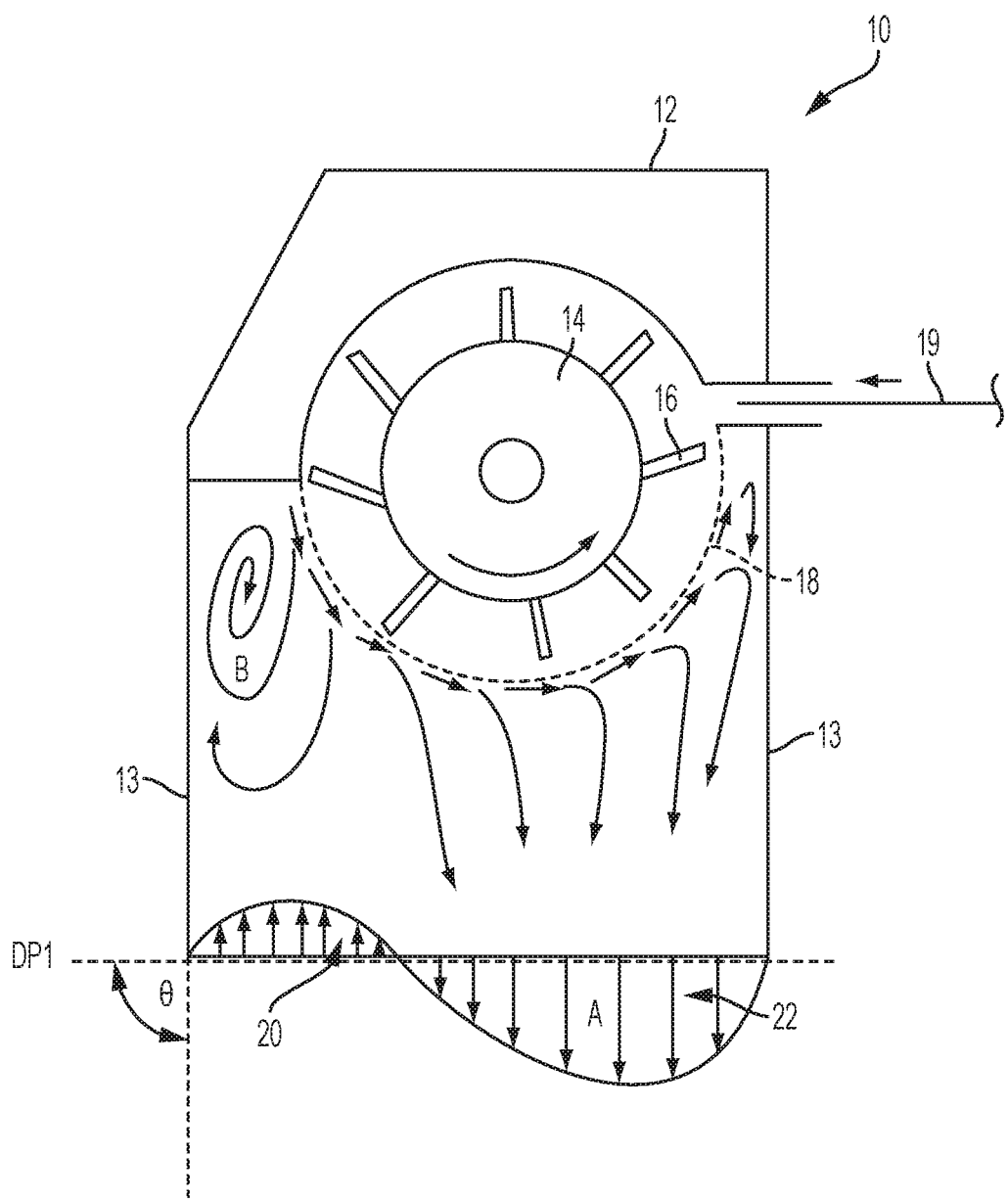
Figure 2:
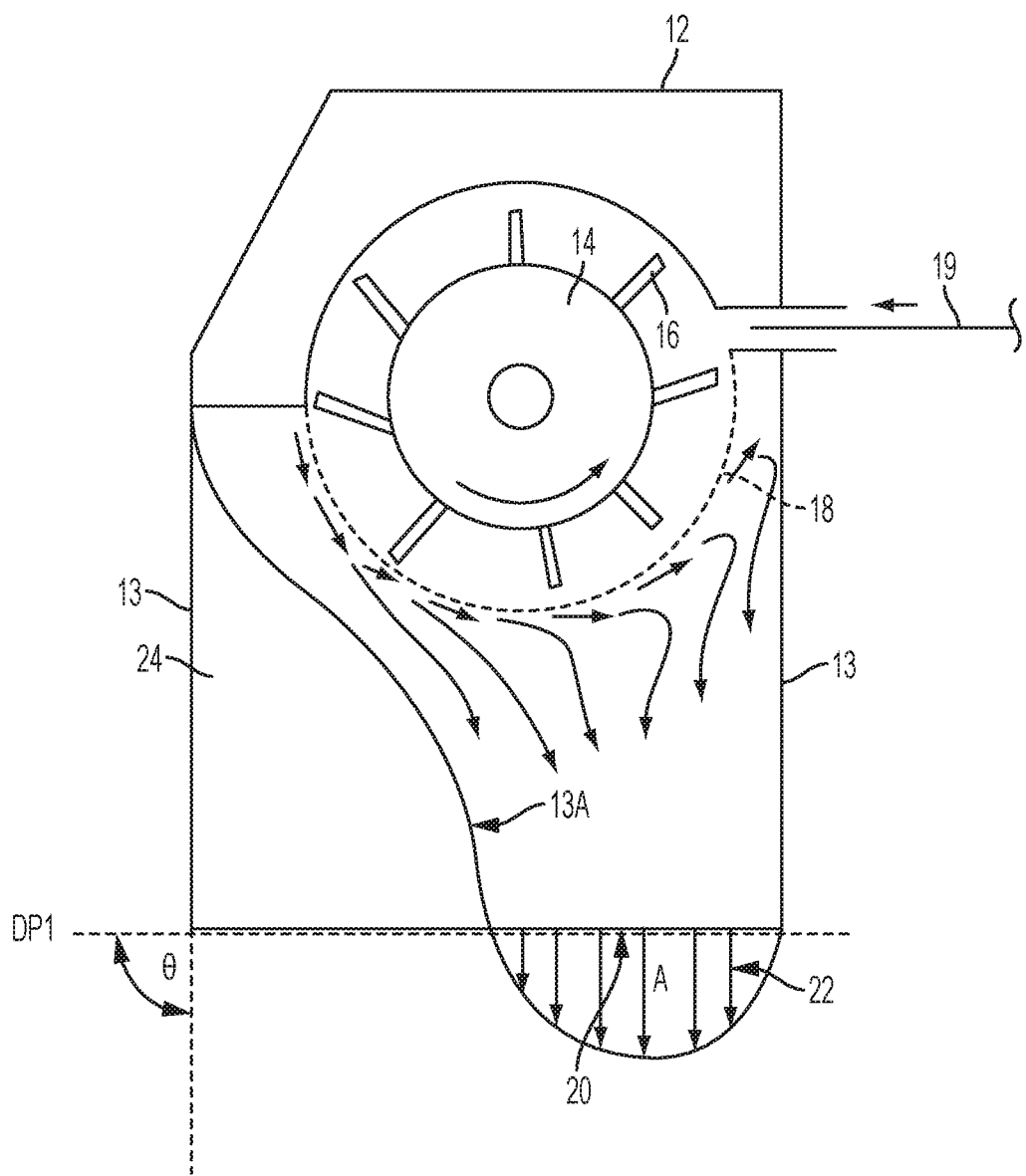

In one example as shown in FIG. 2, a discretizer 10 of the present invention comprises a housing 12 and a rotor 14 having a plurality of swinging hammers 16 and a screen 18. In one example, the rotor 14, swinging hammers 16 and screen 18 are known components in existing discretizers that can be reapplied to the discretizers of the present invention. As the rotor 14 rotates in the direction of the arrow, a web of pulp 19 is introduced into the discretizer 10, for example through an inlet in the housing 12, such that the inlet in the housing 12 receives the web of pulp 19, such that the swinging hammers 16 individualize pulp fibers from the web of pulp 19. The individualized pulp fibers may then travel through the screen 18. The discretizer 10 further comprises an insert 24 that prevents the air flow as shown in the general air flow arrows and shown in the air flow map 22 from the rotor 14 through the screen 18 from creating one or more zones of separated flow B (shown in Prior Art FIGS. 1A-1C) and forces the air flow to be unidirectional in the general direction of A as shown in the air flow map 22. This insert 24 can be a permanent fixture within the discretizer 10 or can be a temporary structure within the discretizer 10. The insert 24 further creates an intermediate wall 13A that configures the discharge outlet 20 to exhibit a discharge area less than the projected area of the screen 18 upon the discharge plan DP1. This discretizer 10 exhibits a discharge area in a discharge plane DP1 oriented at a discharge angle θ of greater than 20° and/or greater than 30° and/or 40° and/or greater than 50° and/or greater than 60° and/or about 90°.

Figure 3:
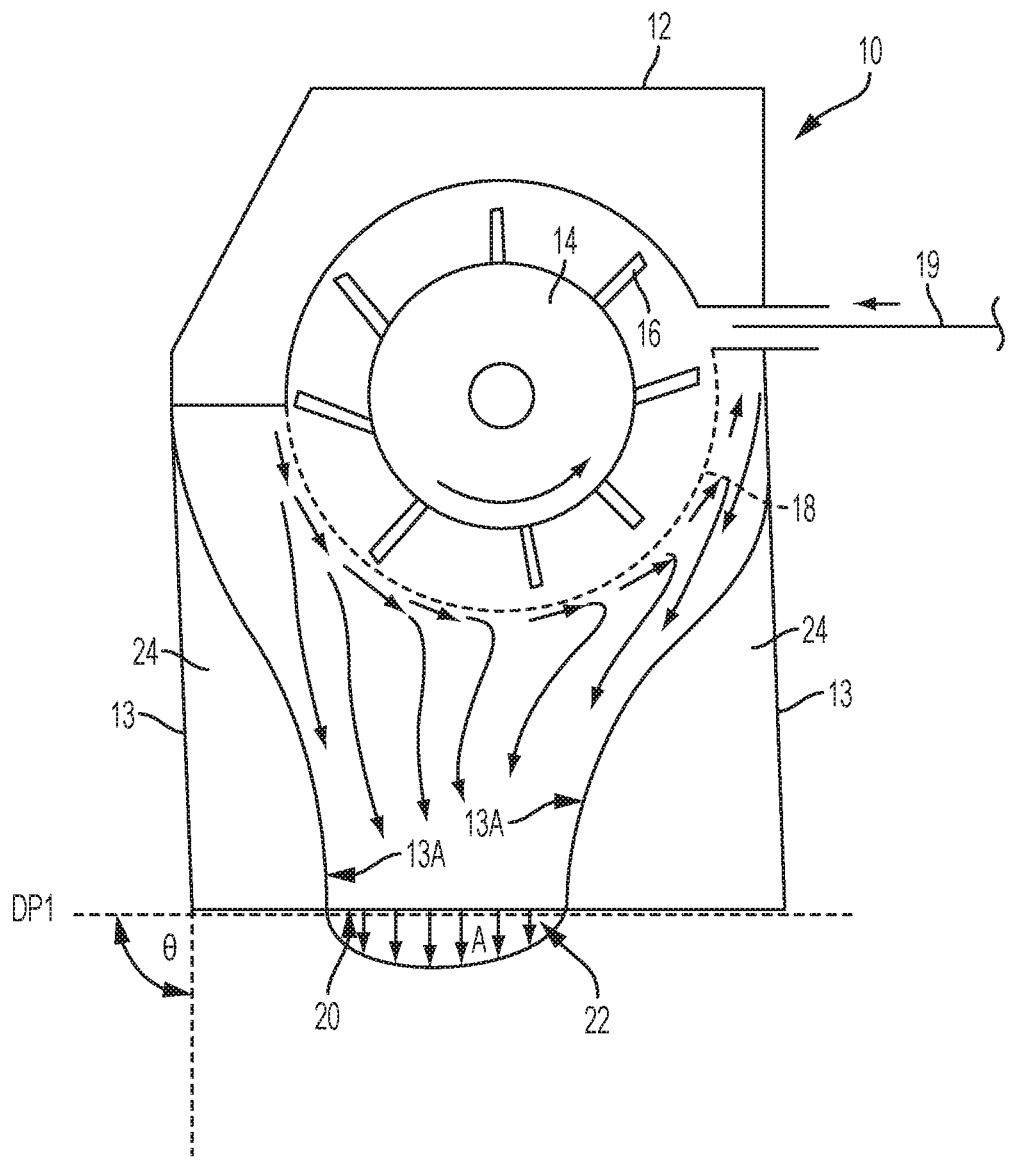

As shown in FIG. 3, a discretizer 10 of the present invention comprises a housing 12 and a rotor 14 having a plurality of swinging hammer 16 and a screen 18. As the rotor 14 rotates in the direction of the arrow, a web of pulp 19 is introduced into the discretizer 10, for example through an inlet in the housing 12, such that the swinging hammers 16 individualize pulp fibers from the web of pulp 19. The individualized pulp fibers may then travel through the screen 18. The discretizer 10 further comprises one or more and/or two or more inserts 24 (in this case two inserts 24), which may be mirror images of one another that prevents the air flow as shown in the general air flow arrows and shown in the air flow map 22 from the rotor 14 through the screen 18 from creating one or more zones of separated flow B (shown in Prior Art FIGS. 1A-1C) and forces the air flow to be unidirectional in the general direction of A as shown in the air flow map 22. The inserts 24 can be permanent fixtures within the discretizer 10 or can be temporary structures within the discretizer 10. The inserts 24 further create intermediate walls 13A, such as CD walls below and closest to the rotor that are non-parallel with each other, that configure the discharge outlet 20 to exhibit a discharge area less than the projected area of the screen 18 upon the discharge plan DP1. This discretizer 10 exhibits a discharge area in a discharge plane DP1 oriented at a discharge angle θ of greater than 20° and/or greater than 30° and/or 40° and/or greater than 50° and/or greater than 60° and/or about 90°.

Figure 4:
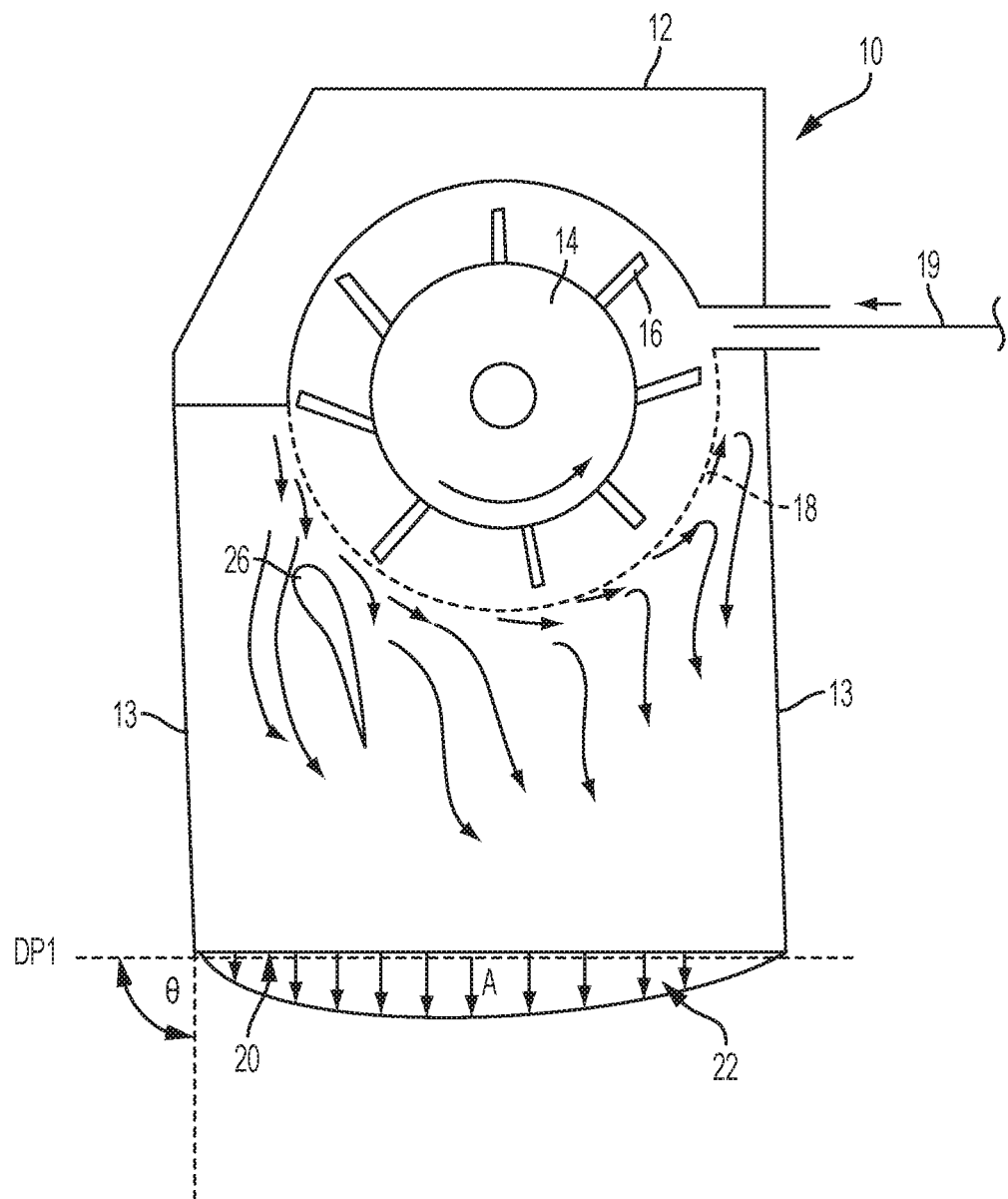

In another example as shown in FIG. 4, a discretizer 10 of the present invention comprises a housing 12 and a rotor 14 having a plurality of swinging hammer 16 and a screen 18. As the rotor 14 rotates in the direction of the arrow, a web of pulp 19 is introduced into the discretizer 10, for example through an inlet in the housing 12, such that the swinging hammers 16 individualize pulp fibers from the web of pulp 19. The individualized pulp fibers may then travel through the screen 18. The discretizer 10 further comprises a one or more cross flow members 26 that prevents the air flow as shown in the general air flow arrows and shown in the air flow map 22 from the rotor 14 through the screen 18 from creating one or more zones of separated flow B (shown in Prior Art FIGS. 1A-1C) and forces the air flow to be unidirectional in the general direction of A as shown in the air flow map 22. This cross flow member 26 may be a permanent fixture within the discretizer 10 or may be a temporary structure within the discretizer 10. In this example, the discharge outlet 20 exhibits a discharge area greater than the projected area of the screen 18 upon the discharge plan DP1. This discretizer 10 exhibits a discharge area in a discharge plane DP1 oriented at a discharge angle θ of greater than 20° and/or greater than 30° and/or 40° and/or greater than 50° and/or greater than 60° and/or about 90°.

Figure 5:
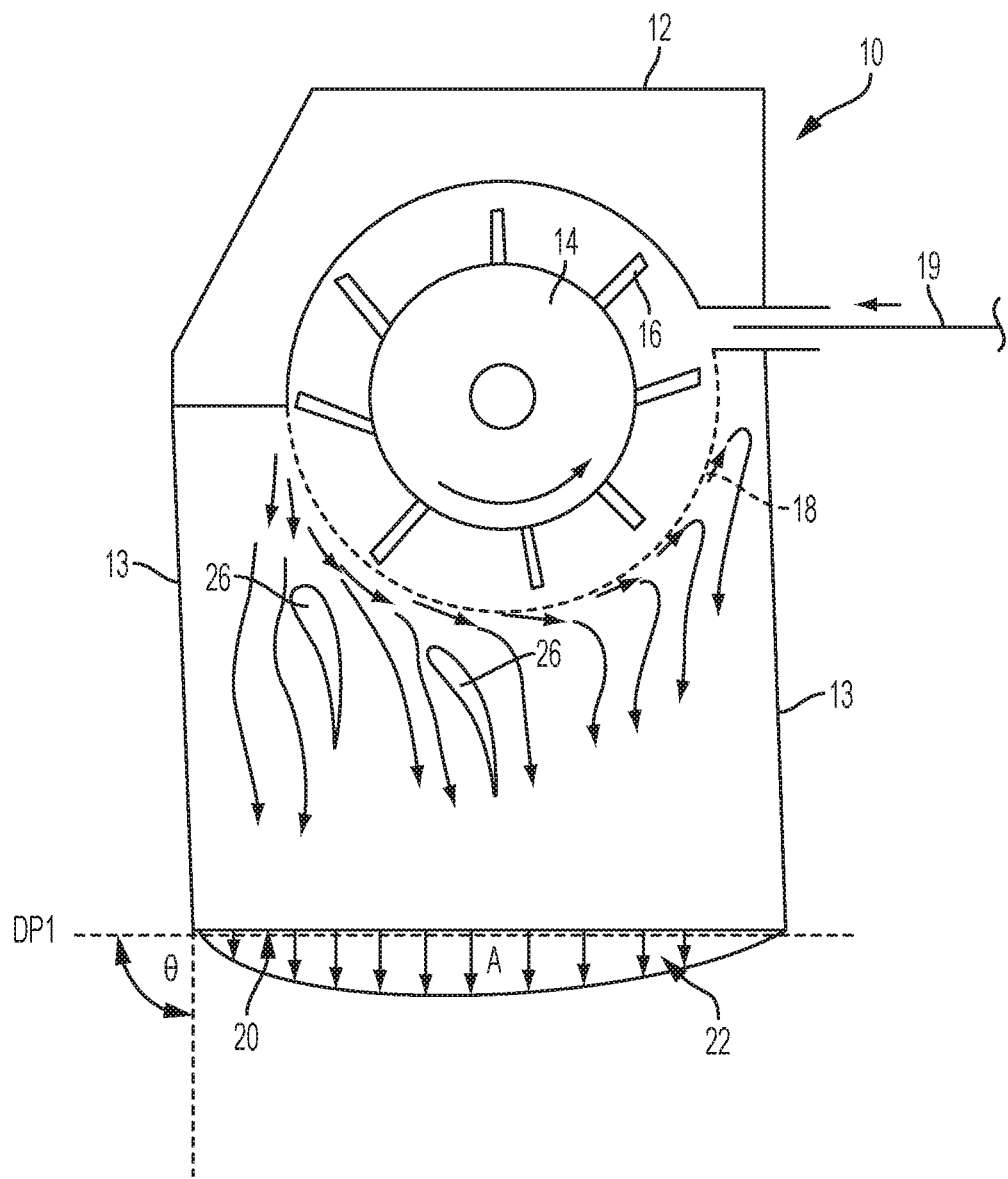
FIG. 5 is another example of a discretizer in accordance with the present invention.

As shown in FIG. 5, a discretizer 10 of the present invention comprises a housing 12 and a rotor 14 having a plurality of swinging hammer 16 and a screen 18. As the rotor 14 rotates in the direction of the arrow, a web of pulp 19 is introduced into the discretizer 10, for example through an inlet in the housing 12, such that the swinging hammers 16 individualize pulp fibers from the web of pulp 19. The individualized pulp fibers may then travel through the screen 18. The discretizer 10 further comprises a two or more cross flow members 26 that prevent the air flow as shown in the general air flow arrows and shown in the air flow map 22 from the rotor 14 through the screen 18 from creating one or more zones of separated flow B (shown in Prior Art FIGS. 1A-1C) and forces the air flow to be unidirectional in the general direction of A as shown in the air flow map 22. These cross flow members 26 may be a permanent fixture within the discretizer 10 or may be a temporary structure within the discretizer 10. In this example, the discharge outlet 20 exhibits a discharge area greater than the projected area of the screen 18 upon the discharge plan DP1. This discretizer 10 exhibits a discharge area in a discharge plane DP1 oriented at a discharge angle θ of greater than 20° and/or greater than 30° and/or 40° and/or greater than 50° and/or greater than 60° and/or about 90°.

Figure 6:
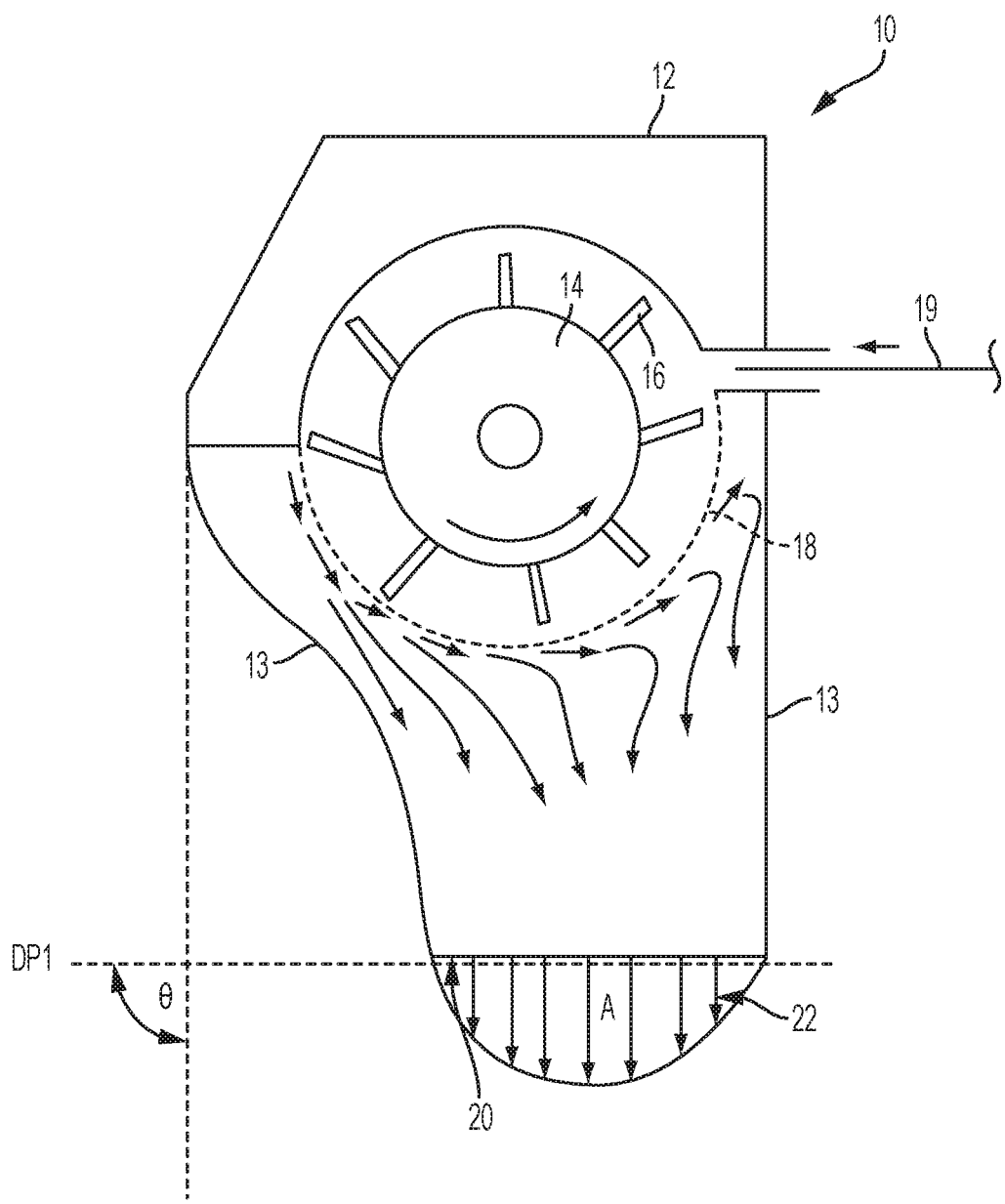
FIG. 6 is another example of a discretizer in accordance with the present invention.

In yet another example as shown in FIG. 6, a discretizer 10 of the present invention comprises a housing 12 and a rotor 14 having a plurality of swinging hammer 16 and a screen 18. As the rotor 14 rotates in the direction of the arrow, a web of pulp 19 is introduced into the discretizer 10, for example through an inlet in the housing 12, such that the swinging hammers 16 individualize pulp fibers from the web of pulp 19. The individualized pulp fibers may then travel through the screen 18. The discretizer 10 comprises non-parallel walls 13. This example is similar to the discretizer 10 of FIG. 2 except that the housing 12 is designed with non-parallel walls 13 rather than using an insert 24 to address the air flow management. The non-parallel walls 13 create the air flow as shown in the general air flow arrows and shown in the air flow map 22 from the rotor 14 through the screen 18 from creating one or more zones of separated flow B (shown in Prior Art FIGS. 1A-1C) and forces the air flow to be unidirectional in the general direction of A as shown in the air flow map 22. In this example, the discharge outlet 20 exhibits a discharge area equal to or less than, for example less than, the projected area of the screen 18 upon the discharge plan DP1. This discretizer 10 exhibits a discharge area in a discharge plane DP1 oriented at a discharge angle θ of greater than 20° and/or greater than 30° and/or 40° and/or greater than 50° and/or greater than 60° and/or about 90°.

Figure 7:
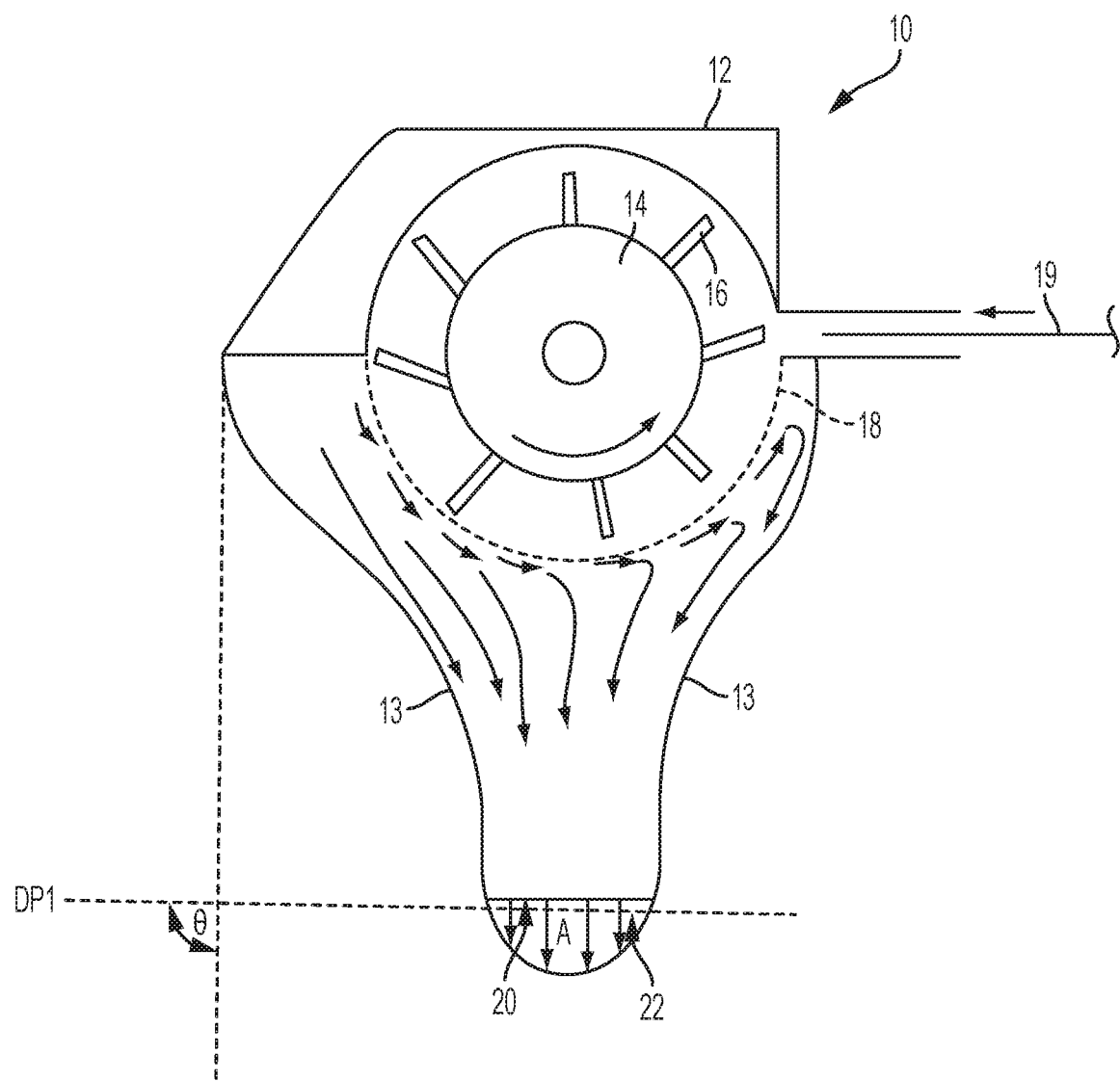
FIG. 7 is another example of a discretizer in accordance with the present invention.

In yet another example as shown in FIG. 7, a discretizer 10 of the present invention comprises a housing 12 and a rotor 14 having a plurality of swinging hammer 16 and a screen 18. As the rotor 14 rotates in the direction of the arrow, a web of pulp 19 is introduced into the discretizer 10, for example through an inlet in the housing 12, such that the swinging hammers 16 individualize pulp fibers from the web of pulp 19. The individualized pulp fibers may then travel through the screen 18. The discretizer 10 comprises non-parallel walls 13, in this case both walls 13 have been designed to approach one another at some point along their lengths. This example is similar to the discretizer 10 of FIG. 6 except that both walls 13 are designed to address the air flow management rather than using a single wall or two inserts 24 like that of FIG. 3 to address the air flow management. The non-parallel walls 13 create the air flow as shown in the general air flow arrows and shown in the air flow map 22 from the rotor 14 through the screen 18 from creating one or more zones of separated flow B (shown in Prior Art FIGS. 1A-1C) and forces the air flow to be unidirectional in the general direction of A as shown in the air flow map 22. In this example, the discharge outlet 20 exhibits a discharge area less than the projected area of the screen 18 upon the discharge plan DP1. This discretizer 10 exhibits a discharge area in a discharge plane DP1 oriented at a discharge angle θ of greater than 20° and/or greater than 30° and/or 40° and/or greater than 50° and/or greater than 60° and/or about 90°.

Figure 8:
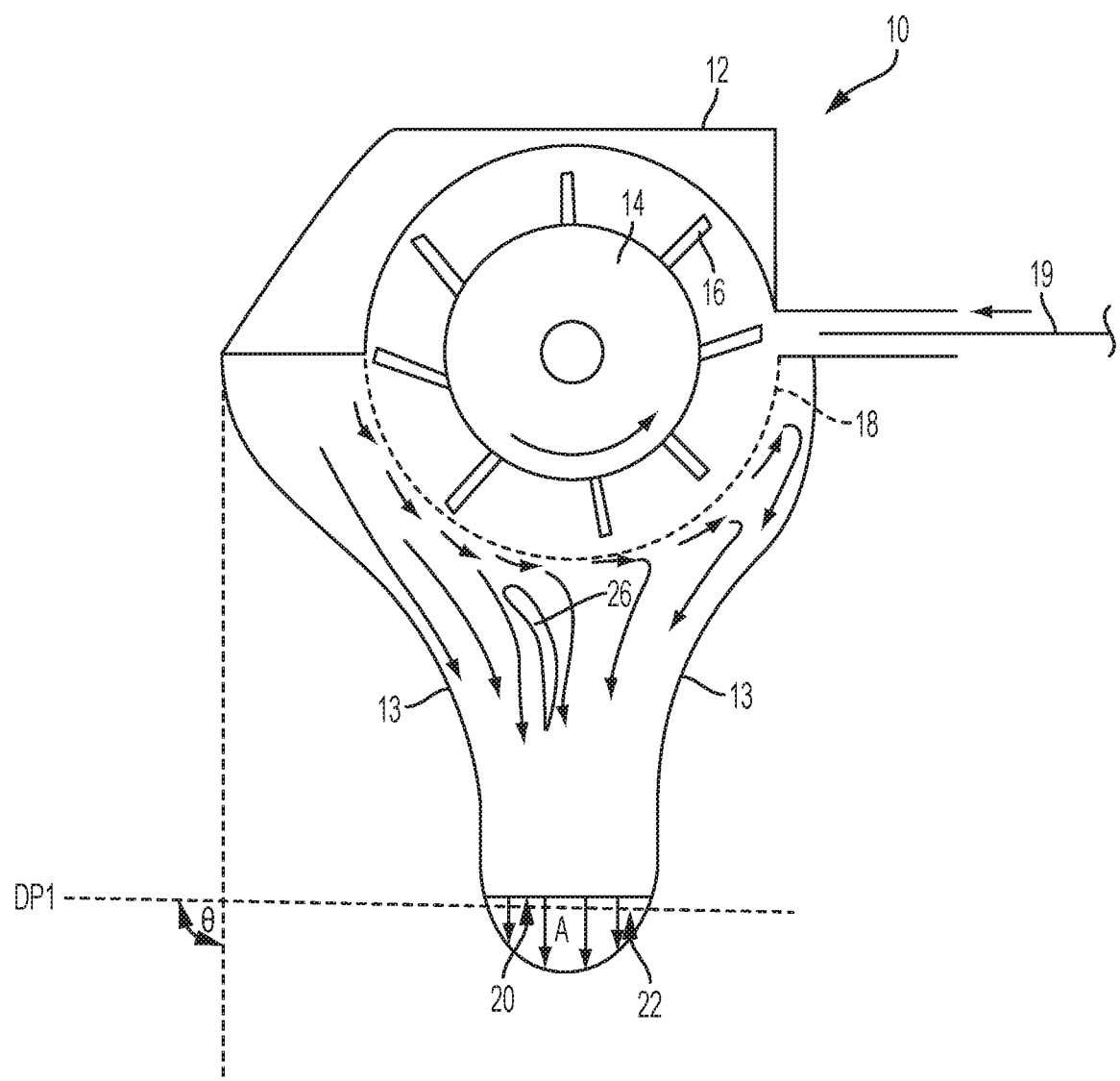
FIG. 8 is another example of a discretizer in accordance with the present invention.

As shown in FIG. 8, this discretizer 10 is similar to the discretizer 10 shown in FIG. 7 with the addition of one or more cross flow members 26 within the air flow that prevents the air flow as shown in the general air flow arrows and shown in the air flow map 22 from the rotor 14 through the screen 18 from creating one or more zones of separated flow B (shown in Prior Art FIGS. 1A-1C) and forces the air flow to be unidirectional in the general direction of A as shown in the air flow map 22. This cross flow member 26 may be a permanent fixture within the discretizer 10 or may be a temporary structure within the discretizer 10. In this example, the discharge outlet 20 exhibits a discharge area less than the projected area of the screen 18 upon the discharge plan DP1. This discretizer 10 exhibits a discharge area in a discharge plane DP1 oriented at a discharge angle θ of greater than 20° and/or greater than 30° and/or 40° and/or greater than 50° and/or greater than 60° and/or about 90°.

The discretizers and/or components thereof may be made from any suitable materials such as metal, polycarbonate, glass, fiberglass, lexan, plastic, and mixtures thereof.

In one example, the discretizer of the present invention is a hammer mill. The rotor of the discretizer may comprise one or more hammers, such as swinging hammers.

In one example, the discretizer of the present invention avoids creating zones of separated flow during operation.

The discretizer of the present invention may comprise one or more walls positioned between the rotor and the discharge outlet. In one example, at least one of the walls is tapered along its length toward the discharge outlet. In another example, two of the walls are tapered along their length toward the discharge outlet.

In one example, the discretizer individualizes fibers, for example pulp fibers, such as wood pulp fibers. The sources of the solid additives may be bales of fibers and/or rolled pulp.

Method for Making a Fibrous Structure

A non-limiting example of a method for making a fibrous structure according to the present invention comprises the steps of:

a. providing a filament source, such as a die, for example a meltblow die, such as a multi-row capillary die and/or a knife edge die and/or a spunbond die;

b. supplying at least a first polymer to the filament source;

c. producing a plurality of filaments comprising the first polymer from the filament source;

d. combining the filaments with solid additives, for example pulp fibers, delivered from a discretizer according to the present invention, such as a hammer mill to form a mixture; and e. collecting the mixture on a collection device, such as a fabric and/or belt, for example a patterned belt that imparts a pattern, for example a non-random, repeating pattern to a fibrous structure, with or without the aid of a vacuum box, to produce a fibrous structure.

In one example, during operation, the filament source receives molten polymer, for example a polyolefin, such as polypropylene, under pressure. This molten polymer is then spun via pressure from the filament source (for example a die) to form filaments. The filaments are subjected to cooling air, from one or more air sources, which serves to lower the molten polymer to below its freezing temperature. The filaments continue traveling toward the collection device and may be aided in attenuation by a venturi attenuation zone. Subsequent to the venturi attenuation zone, one or more solid additives, for example pulp fibers, are then introduced into the filaments to form a mixture. The mixture may be formed within a forming box, for example a coform box. The mixture is then collected on the collection device, with or without the aid of the vacuum box, to form the fibrous structure. The collection device may be a belt or fabric. In one example, the collection device is a patterned and/or molded belt that results in the fibrous structure exhibiting a surface pattern, such as a non-random, repeating pattern of microregions. The molded belt may have a three-dimensional pattern on it that gets imparted to the fibrous structure during the process. For example, the patterned belt may comprise a reinforcing structure, such as a fabric upon which a polymer resin is applied in a pattern. The pattern may comprise a continuous or semi-continuous network of the polymer resin within which one or more discrete conduits are arranged.

After the fibrous structure has been formed on the collection device, the fibrous structure may be subjected to post-processing operations such as embossing, thermal bonding, tuft-generating operations, moisture-imparting operations, slitting, folding, lotioning, surface treating, and combining with other fibrous structure plies operations to form a finished fibrous structure or sanitary tissue product, such as a paper towel, bath tissue, wipe, for example a wet wipe, and/or a facial tissue. One example of a surface treating operation that the fibrous structure may be subjected to is the surface application of an elastomeric binder, such as ethylene vinyl acetate (EVA), latexes, and other elastomeric binders. Such an elastomeric binder may aid in reducing the lint created from the fibrous structure during use by consumers. The elastomeric binder may be applied to one or more surfaces of the fibrous structure in a pattern, especially a non-random repeating pattern, or in a manner that covers or substantially covers the entire surface(s) of the fibrous structure.

After the fibrous structure has been formed on the collection device, such as a patterned belt, the fibrous structure may be calendered, for example, while the fibrous structure is still on the collection device.

In another example, the fibrous structure may be densified, for example with a non-random repeating pattern. In one example, the fibrous structure may be carried on a porous belt and/or fabric, through a nip, for example a nip formed by a heated steel roll and a rubber roll such that the fibrous structure is deflected into one or more of the pores of the porous belt resulting in localized regions of densification. Non-limiting examples of suitable porous belts and/or fabrics are commercially available from Albany International under the trade names VeloStat, ElectroTech, and MicroStat. In one example, the nip applies a pressure of at least 5 pounds per lineal inch (pli) and/or at least 10 pli and/or at least 20 pli and/or at least 50 pli and/or at least 80 pli.

The process of the present invention may include preparing individual rolls of fibrous structure and/or sanitary tissue product comprising such fibrous structure(s) that are suitable for consumer use.

Non-Limiting Examples of Processes for Making a Fibrous Structure of the Present Invention Example 1

A 47.5%: 27.5%: 20.0%: 5% blend of Equistar MF650x polypropylene: Equistar 650W polypropylene: Equistar PH835 polypropylene: Polyvel S-1416 wetting agent is dry blended, to form a melt blend. The melt blend is heated to 475° F. through a melt extruder. A 15.5" wide Biax 12 row spinnerette with 192 nozzles per cross-direction inch, commercially available from Biax Fiberfilm Corporation, is utilized. 40 nozzles per cross-direction inch of the 192 nozzles have a 0.018" inside diameter while the remaining nozzles are unused for PP delivery Approximately 0.19 grams per hole per minute (ghm) of the melt blend is extruded from the open nozzles to form meltblown filaments from the melt blend. Approximately 420 SCFM of compressed air is heated such that the air exhibits a temperature of 395° F. at the spinnerette. Approximately 500 grams/minute of Koch 4825 semi-treated SSK pulp is defibrillated through a hammermill to form SSK wood pulp fibers (solid additive). Approximately 1600 SCFM of air at 80° F. and 80% relative humidity (RH) is drawn into the discretizer of the present invention and carries the pulp fibers to a solid additive spreader. The solid additive spreader turns the pulp fibers and distributes the pulp fibers in the cross-direction such that the pulp fibers are injected into the meltblown filaments at a non-90° angle (a non-perpendicular fashion) for example at an angle of less than 90° as described herein through a 4"×15" cross-direction (CD) slot. A forming box surrounds the area where the meltblown filaments and pulp fibers are commingled. This forming box is designed to reduce the amount of air allowed to enter or escape from this commingling area A forming vacuum pulls air through a forming fabric thus collecting the commingled meltblown filaments and pulp fibers to form a fibrous structure. The forming vacuum is adjusted until an additional 400 SCFM of room air is drawn into the slot in the forming box. The fibrous structure formed by this process comprises about 75% by dry fibrous structure weight of pulp and about 25% by dry fibrous structure weight of meltblown filaments.

Optionally, a meltblown layer of the meltblown filaments can be added to one or both sides of the above formed fibrous structure. This addition of the meltblown layer can help reduce the lint created from the fibrous structure during use by consumers and is preferably performed prior to any thermal bonding operation of the fibrous structure. The meltblown filaments for the exterior layers can be the same or different than the meltblown filaments used on the opposite layer or in the center layer(s).

The fibrous structure may be convolutedly wound to form a roll of fibrous structure. The end edges of the roll of fibrous structure may be contacted with a material to create bond regions.

Example 2

A 47.5%: 27.5%: 20.0%: 5% blend of Equistar MF650x polypropylene: Equistar 650W polypropylene: Equistar PH835 polypropylene: Polyvel S-1416 wetting agent is dry blended, to form a melt blend. The melt blend is heated to 400° F. through a melt extruder. A 15.5 inch wide Biax 12 row spinnerette with 192 nozzles per cross-direction inch, commercially available from Biax Fiberfilm Corporation, is utilized. 40 nozzles per cross-direction inch of the 192 nozzles have a 0.018 inch inside diameter while the remaining nozzles are solid, i.e. there is no opening in the nozzle. Approximately 0.19 grams per hole per minute (ghm) of the melt blend is extruded from the open nozzles to form meltblown filaments from the melt blend. Approximately 415 SCFM of compressed air is heated such that the air exhibits a temperature of 395° F. at the spinnerette. Approximately 475 g/minute of a blend of 70% Golden Isle (from Georgia Pacific) 4825 semi-treated SSK pulp and 30% *Eucalyptus* is defibrillated through a hammermill to form SSK and Euc wood pulp fibers (solid additive). Air at 85-90° F. and 85% relative humidity (RH) is drawn into the discretizer of the present invention. Approximately 2400 SCFM of air carries the pulp fibers to two solid additive spreaders. The solid additive spreaders turn the pulp fibers and distribute the pulp fibers in the cross-direction such that the pulp fibers are injected into the meltblown filaments at a non-90° angle (a non-perpendicular fashion) for example at an angle of less than 90° as described herein through a 4 inch×15 inch cross-direction (CD) slot. The two solid additive spreaders are on opposite sides of the meltblown filaments facing one another. A forming box surrounds the area where the meltblown filaments and pulp fibers are commingled. This forming box is designed to reduce the amount of air allowed to enter or escape from this commingling area. A forming vacuum pulls air through a collection device, such as a patterned belt, thus collecting the commingled meltblown filaments and pulp fibers to form a fibrous structure. The fibrous structure formed by this process comprises about 75% by dry fibrous structure weight of pulp and about 25% by dry fibrous structure weight of meltblown filaments.

Optionally, a meltblown layer of the meltblown filaments can be added to one or both sides of the above formed fibrous structure. This addition of the meltblown layer can help reduce the lint created from the fibrous structure during use by consumers and is preferably performed prior to any thermal bonding operation of the fibrous structure. The meltblown filaments for the exterior layers can be the same or different than the meltblown filaments used on the opposite layer or in the center layer(s).

The fibrous structure, while on a patterned belt (e.g. Velostat 170PC 740 by Albany International), is calendered at about 40 PLI (Pounds per Linear CD inch) with a metal roll facing the fibrous structure and a rubber coated roll facing the patterned belt. The steel roll having an internal temperature of 300° F. as supplied by an oil heater.

Optionally, the fibrous structure can be adhered to a metal roll, or creping drum, using sprayed, printed, slot extruded (or other known methodology) creping adhesive solution. The fibrous structure is then creped from the creping drum and foreshortened. Alternatively or in addition to creping, the fibrous structure may be subjected to mechanical treatments such as ring rolling, gear rolling, embossing, rush transfer, tuft-generating operations, and other similar fibrous structure deformation operations.

Optionally, two or more plies of the fibrous structure can be embossed and/or laminated and/or thermally bonded together to form a multi-ply fibrous structure.

The fibrous structure may be convolutedly wound to form a roll of fibrous structure. The end edges of the roll of fibrous structure may be contacted with a material to create bond regions.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for discretizing a source of solid additives, the method comprising the steps of providing a discretizer comprising a housing and a rotor movable within the housing, wherein the housing comprises a discharge outlet and one or more inserts such that the discharge outlet exhibits a discharge area less than a projected area upon a discharge plane of a screen that partially surrounds the rotor; supplying a source of solid additives selected from the group consisting of: bales of fibers, rolled pulp, web of pulp, and mixtures thereof to the discretizer such that the discretizer discretizes the source of solid additives into a plurality of solid additives during operation of the discretizer.

2. The method according to claim 1 wherein the discretizer is a hammer mill.

3. The method according to claim 1 wherein the discretizer avoids creating zones of separated flow during operation.

4. The method according to claim 1 wherein the discharge area in the discharge plane is oriented at a discharge angle of greater than 20°.

5. The method according to claim 4 wherein the discharge area of the discharge outlet is equal to or less than the rotor's projected area upon the discharge plane.

6. A method for discretizing a source of solid additives, the method comprising the steps of providing a hammer mill comprising a housing and a rotor movable within the housing, wherein the housing comprises a discharge outlet and one or more inserts such that the discharge outlet exhibits a discharge area less than a projected area upon a discharge plane of a screen; supplying a source of solid additives selected from the group consisting of: bales of fibers, rolled pulp, web of pulp, and mixtures thereof to the hammer mill such that the hammer mill discretizes the source of solid additives into a plurality of solid additives during operation of the hammer mill.

7. The method according to claim 6 wherein the hammer mill avoids creating zones of separated flow during operation.

8. The method according to claim 6 wherein the discharge area in the discharge plane is oriented at a discharge angle of greater than 20°.

9. The method according to claim 8 wherein the discharge area of the discharge outlet is equal to or less than the rotor's projected area upon the discharge plane.

* * * * *